3 Sheets—Sheet 1.

E. F. BEAL,

Assignor by mesne assignments, to himself and S. Snow.

LASTING MACHINE.

No. 10,454. Reissued Feb. 26, 1884.

WITNESSES

Chas. H. Ryer.

M. S. Smeabaugh

INVENTOR

Ezra F. Beal

By S. M. Smeabaugh

Attorney

N. PETERS, Photo-Lithographer, Washington, D. C.

E. F. BEAL,

Assignor by mesne assignments, to himself and S. Snow.

LASTING MACHINE.

No. 10,454. Reissued Feb. 26, 1884.

WITNESSES

Chas. J. Styer

W. S. Simsabaugh

INVENTOR

Ezra Fluent Beal

By S. W. Simsabaugh

Attorney

N. PETERS, Photo-Lithographer, Washington, D. C.

3 Sheets—Sheet 3.

E. F. BEAL,

Assignor by mesne assignments, to himself and S. Snow.

LASTING MACHINE.

No. 10,454. Reissued Feb. 26, 1884.

WITNESSES

Chas. F. Ayer.

M. S. Sinsabaugh

By

INVENTOR

Ezra Fluent Beal

L. M. Sinsabaugh

Attorney

N. PETERS, Photo-Lithographer, Washington, D. C.

UNITED STATES PATENT OFFICE.

EZRA FLUENT BEAL, OF EVERETT, MASSACHUSETTS, ASSIGNOR, BY MESNE ASSIGNMENTS, TO HIMSELF AND STEPHEN SNOW, OF SAME PLACE.

LASTING-MACHINE.

SPECIFICATION forming part of Reissued Letters Patent No. 10,454, dated February 26, 1884.

Original No. 277,664, dated May 15, 1883. Application for reissue filed December 4, 1883.

*To all whom it may concern:*

Be it known that I, EZRA F. BEAL, a citizen of the United States, residing at Everett, in the county of Middlesex and State of Massachusetts, have invented a new and useful Improvement in Machinery for Lasting the Uppers of Shoes; and I do hereby declare the same to be described in the following specification and represented in the accompanying drawings, of which—

Figure 1:
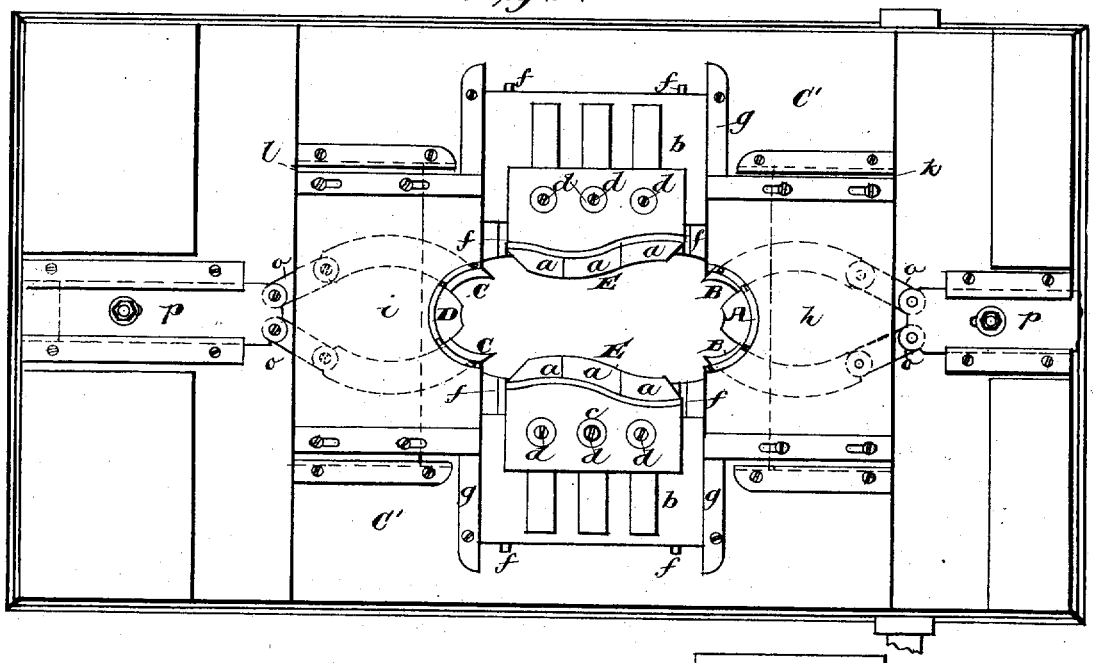
Figure 5:
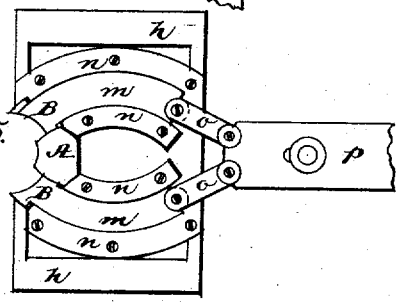
Figure 3:
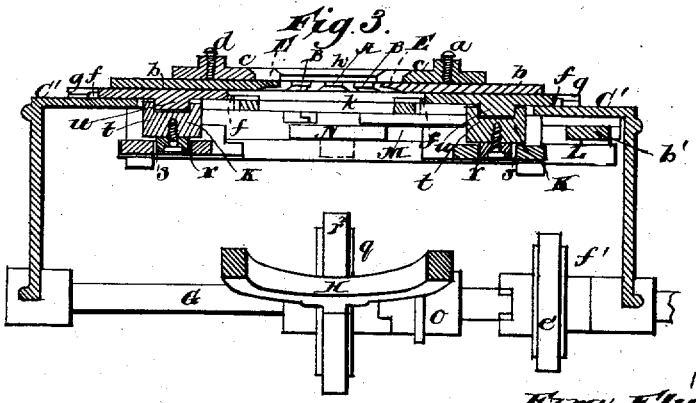
Figure 2:
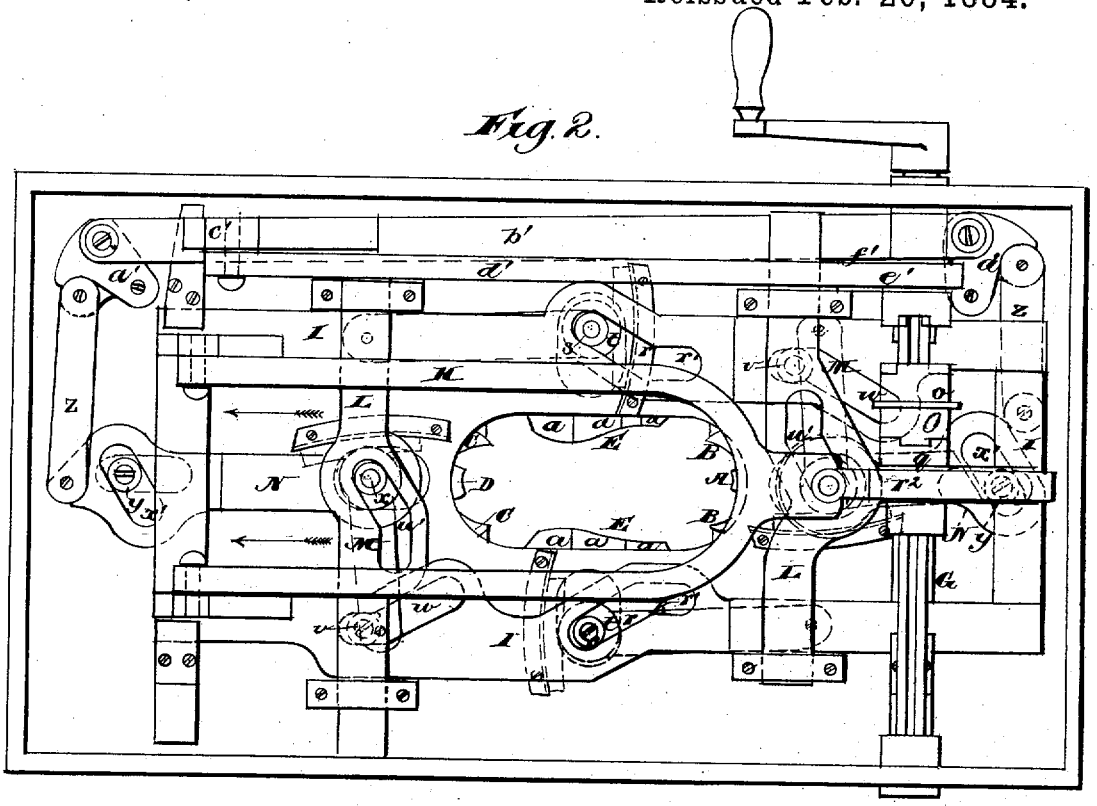
Figure 4:
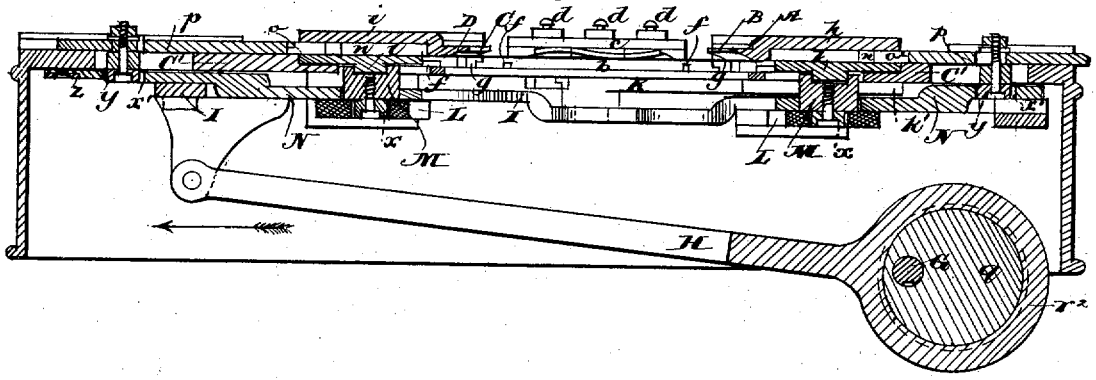
Figure 6:
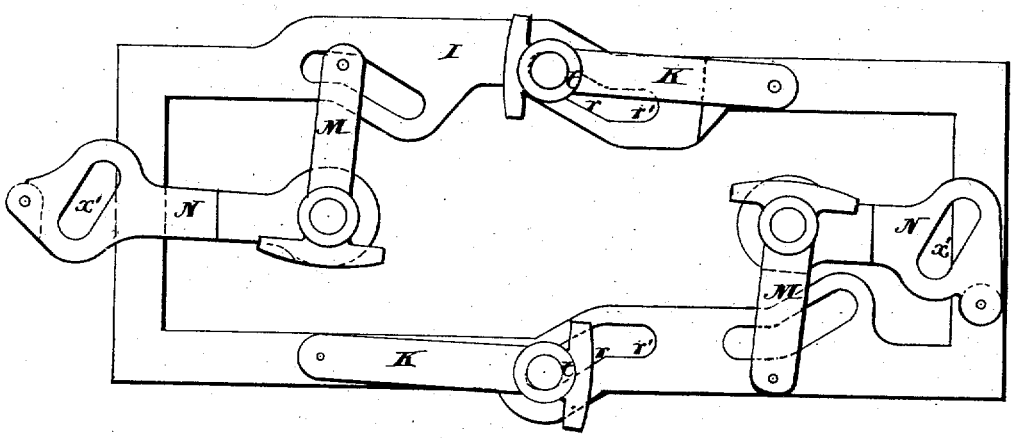

Figure 1 is a top view, and Fig. 2 an under side view, of a lasting-machine provided with my invention. Fig. 3 is a transverse and median section. Fig. 4 is a longitudinal and median section of the machine. Fig. 5 is an under side view of the cap-plate *h* and the toe-jaws B A B, the heel-jaws C D C and their carrying cap-plate *i* being of like construction. Fig. 6 is a top view of the cam-grooved frame I, to be described, such figure also showing the arms K K and M M, arranged on top of such frame and pivoted to the lower surface of the top of the bed C′.

The machine has three heel, three toe, and two intervening or side jaws to perform the work of forcing the leather of a shoe-upper down upon an insole laid upon the sole of a last; and, besides, such machine has mechanism for effecting the necessary intermittent reciprocating movements of such jaws. In Fig. 1 of the drawings the three toe-jaws are marked B A B, the three heel-jaws C D C, and the two intervening or side jaws E E.

Each of the jaws E is in separate sections or plates *a a a*, which are arranged on one of two sliding plates, *b b*, and held thereto by guide-plate *c*, extending across them and secured to the plate *b*, and provided with grooves to receive and sustain the shanks of the plates *a*. The plate *c* is provided with clamp-screws *d*, which, when set against the said shanks, serve to hold the plates *a* in any desired position. Each sliding plate *b* is supported by and moves on two parallel rails, *f f*, projecting upward from the bed C′ and into corresponding grooves in the under side of the sliding plate, such sliding plates being arranged between and against other and parallel guides, *g g*, extending upward from the bed.

The mechanism for operating or moving the sliding plates *b b*, which carry the jaws E E, will be hereinafter explained.

The two median toe and heel jaws A and D are secured to two separate cap-plates, *h* and *i*, arranged on and fixed in slideways *k l*, and adapted to be moved in longitudinal and rectilinear directions toward and from each other on or over the bed C′. The two auxiliary heel-jaws, like the two auxiliary toe-jaws, have circularly-curved shanks *m*, arranged between circularly-curved guides *n*, as shown, fixed to the cap-plate, the shanks *m* of each pair of jaws being connected by links *o o* to slides *p*, arranged as shown, and adapted to be moved longitudinally and rectilinearly upon the top of the bed C′.

The mechanism for effecting the movements of the jaws will now be explained.

Extending across and beneath the bed C′ of the machine is a shaft, G, journaled in the sides thereof, which has an eccentric, *q*, loosely mounted thereon, at or near the middle of said shaft, and the eccentric *q* is embraced by the collar $r^2$ of a furcated pitman, H. The pitman is jointed at the ends of its prongs to a frame, I, adapted to move rectilinearly within the bed C′ and longitudinally thereof. When the eccentric is revolved, reciprocating movements will be imparted to the frame I. This frame I has two angular slots, *r r′*, to receive friction-rollers *s s*, extending into them from two arms, K, which are arranged as shown in Fig. 6, and which are pivoted to the bed C′ at *k′*, Fig. 4. These arms are to swing laterally, each having a step, *t*, to receive a pivot, *u*, extending into it from one of the side-jaw carrying-plates *b b*. By means of the slots *r r′* the arms are moved laterally, and move the plates *b b* toward and away from each other, the longitudinal portions *r′* of the slots effecting no movements of the plates, but answering simply to hold them in position, while the frame I may continue in movement, and the friction-rolls may be in the said longitudinal portions *r′*. The oblique portions *r* of the slots are what operate to produce the lateral swinging of the said arms.

Extending transversely across and below the frame I are two flat slides, L, which, arranged as represented, are adapted to the bed C′, so as to move rectilinearly thereon and transversely thereof. Each of the said slides has through it at its middle an oblique slot, *u′*, and it also has pivoted to it a friction-roller, *v*, to enter the slots *w w*, formed and arranged, as shown, in the frame I.

Arranged over and upon the frame I, in manner as represented in Fig. 6, and pivoted to the bed C′, are two other arms, M M, these arms being near their inner ends pivoted to the slides *k* and *l*, to which the cap-plates *h* and *i* of the toe and heel jaws are fixed. Each arm M has pivoted to it a friction-roller, *x*, that enters the oblique slot *u′* of the next adjacent slide L. There is also pivoted to each arm M one of two flat and slotted arms, N N, which are represented in Fig. 6 in top view, the oblique slots of such arms being shown at *x′ x′*. Into these slots friction-rollers *y y*, pivoted to the slides *p p*, extend. Furthermore, the two arms N N, at their outer ends, are connected by links *z z* with two bell-cranks, *a′ a′*, pivoted to the base C′, and connected by a larger link or bar, *b′*, jointed to them. To a projection, *c′*, from the bar *b′* a pitman, *d′*, is jointed, such pitman having a collar, *e′*, to encompass an eccentric, *f′*, that runs loosely on the shaft G. Between the two eccentrics *f′* and *q*, and to slide on the said shaft, and adapted to it by a "spline" or "feather" connection, is a clutch, O, the two eccentrics being provided with means of engaging either end of the clutch. The clutch is to have a shipper or lever attached to it in any well-known manner, and adapted to move it either into or out of engagement with each of the two eccentrics.

By the mechanism thus described for actuating the side and toe and heel jaws they will be operated in the following manner, it being understood that the machine is to be provided with the usual or proper mechanism for supporting a shoe-last for holding a shoe-upper to be lasted.

The parts being in the position shown in Fig. 4, the jaws are at their outer limit of extension and the cam *q* is on the side of the shaft G away from the pitman H. To operate the machine, the clutch O is interlocked with the hub of the cam *q*, and the cam and shaft can be turned together. Power (manual or other) is then applied to the crank, revolving the shaft G and cam *q*, thus giving the pitman H a rectilinear movement lengthwise of the machine. Through this pitman H a similar movement is communicated to the frame I, moving the latter away from the shaft G. As this frame I thus moves, the angular slots *r r′*, passing the friction-rollers *s s* of the arms K K, cause the latter to swing on their pivots, and thus, through the steps *t t* and pivots *u u*, cause the side jaws, E E, to move inward. During this movement of the arms K K and jaws E E the straight portions of the slots *w w* of the frame I are passing by the friction-rollers *v v* of the two flat transverse slides L L, and bringing these rollers into the oblique portions of such slots. At this juncture, and while the slides I I are still making their rectilinear movement, the straight portions of the slots *u′ u′* in such slides pass the friction-rollers *x x* of the arms M M, bringing such rollers into the oblique portions of such slots. As these rollers *x x* enter the oblique portions of these slots *u′ u′*, the jaws E E are at their inner limit and stop, having folded or bent the sides of the upper onto the insole or sides of the last. The slides I, however, still continue their movement, and, through the arms M M, move the slides *k l*, and cap-plates *h i* impart an inward movement to the toe and heel jaws. These jaws reach their inner limit of motion when the cam *q* has made a semi-revolution. This action of the machine causes the jaws to crimp the edges of the vamp over the last in the usual manner, and the revolution of the shaft G is stopped, or the clutch disengaged from the eccentrics and the shaft continuously rotated, while the jaws hold the vamp in position until properly secured. To release the jaws the clutch is thrown into engagement with the eccentric or cam *q*, and the continued rotation of the shaft reverses the parts and releases the clamping-jaws. After the side jaws, E E, and heel and toe jaws A D have been thrust forward or moved into position to fold the vamp on the last, the two side toe and heel jaws, B B and C C, are moved forward to fold the four corners or quarters of the vamp onto the last, which is effected in the following manner: The clutch O is interlocked with the cam or eccentric *f′*, connecting said eccentric with shaft G, and on the turning of said shaft, and with it the eccentric *f′*, the pitman *d* is given a movement lengthwise of the machine, communicating a rectilinear movement to the bar *b′* away from the shaft G, causing the bell-crank levers *a′ a′* to rock, and, through the links *z z*, swing the arms on their pivots. As these arms swing, their oblique slots *x′ x′*, passing along the friction-rollers *y y*, cause the slides *p p* to move inward, carrying the jaws B B and C C between the guides *n n*. These jaws are retracted by a reverse movement of the parts.

I am aware that a machine has been devised in which there are side jaws and several toe and heel jaws, and that these are all operated to move together.

Having thus described my invention, what I claim, and desire to secure by Letters Patent, is—

1. In a shoe-lasting machine, the combination of sets of opening and closing jaws with the reciprocating slotted frame I, pitman H, and eccentric *q*, as set forth.

2. In a machine for lasting shoes, the combination of the longitudinal and transverse bars for operating the central heel and toe and side jaws with the bifurcated pitman H, eccentric *q*, shaft G, and suitable mechanism for operating said shaft, as set forth.

3. In a shoe-lasting machine, the pitman H, adapted to be operated by the eccentric *q* on the shaft G, in combination with the parallel bars I and transverse bars L, secured in guides to the bed of the machine, as described, and provided with jaws for clamping the sides and the central portions of the heel and toe of the vamp, as set forth.

4. In a machine for lasting shoes, the continuously-rotating shaft G, provided with the eccentrics $q$ and $f'$ and their pitmen connected to the jaw-operating mechanism, as described, in combination with the movable clutch O, whereby the side jaws, and central heel and toe jaws are first operated, and then the two side-toe and side-heel jaws, as set forth.

5. In a shoe-lasting machine, the longitudinal bar $b'$, adapted to be moved in guides by the pitman $d'$, in combination with the bell-crank levers $a'$ $a'$, links $z$ $z$, slides $p$ $p$, and jaws B B and C C, as set forth.

6. In a machine for lasting shoes, the pitman $d'$, adapted to be operated by the eccentric $f'$ on the shaft G, in combination with the bars $b'$, bell-cranks $a'$ $a'$, links $z$ $z$, slides $p$ $p$, and jaws B B and C C, whereby the side-heel and side-toe jaws are thrust forward to stretch the vamp over the last.

EZRA FLUENT BEAL.

Witnesses:

STEPHEN SNOW,

WILL L. CLARK.